(12) United States Patent
Riedl et al.

(10) Patent No.: US 9,796,122 B2
(45) Date of Patent: Oct. 24, 2017

(54) COEXTRUDED FOIL COMPOSITE MATERIAL AND ITS USE IN CARD BODIES

(71) Applicant: GIESECKE & DEVRIENT GMBH, Munich (DE)

(72) Inventors: Josef Riedl, Attenkirchen (DE); Cordula Regensburger, Utting (DE); Andreas Braun, Munich (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 0 days.

(21) Appl. No.: 14/884,008

(22) Filed: Oct. 15, 2015

(65) Prior Publication Data

US 2016/0031144 A1 Feb. 4, 2016

Related U.S. Application Data

(62) Division of application No. 14/172,528, filed on Feb. 4, 2014, which is a division of application No. (Continued)

(30) Foreign Application Priority Data

Feb. 25, 2010 (DE) ........................ 10 2010 009 242

(51) Int. Cl.
*B29C 47/06* (2006.01)
*B42D 25/305* (2014.01)
(Continued)

(52) U.S. Cl.
CPC ........ *B29C 47/065* (2013.01); *B29C 47/0021* (2013.01); *B32B 7/02* (2013.01);
(Continued)

(58) Field of Classification Search
None
See application file for complete search history.

(56) References Cited

U.S. PATENT DOCUMENTS 5,055,345 A 10/1991 Wank et al.
5,089,318 A 2/1992 Shetty et al.
(Continued)

FOREIGN PATENT DOCUMENTS

CA 2 728 468 A1 12/2009
DE 69725128 T2 7/2004
(Continued)

OTHER PUBLICATIONS

Database WPI Week 200460, Thomson Scientific, Jun. 24, 2004, London, GB, 4 pages.
(Continued)

*Primary Examiner* — Jeffrey Wollschlager
(74) *Attorney, Agent, or Firm* — Workman Nydegger

(57) ABSTRACT

A composite film material usable in a data carrier card body includes a first outer plastic layer, an inner plastic layer and a second outer plastic layer, all the layers together forming a co-extruded composite. The plastic material of the first outer layer is a polyethylene terephthalate glycol copolymer (PETG) or contains a PETG, the plastic material of the inner layer is a thermoplastic elastomer (TPC) or containes a TPC, and the plastic material of the second outer layer is a PETG or contains a PETG.

8 Claims, 2 Drawing Sheets

Related U.S. Application Data

13/579,635, filed as application No. PCT/EP2011/000880 on Feb. 23, 2011.

(51) Int. Cl.

| | | |
|---|---|---|
| *B29C 47/00* | (2006.01) | |
| *B32B 7/02* | (2006.01) | |
| *B32B 27/08* | (2006.01) | |
| *B32B 27/36* | (2006.01) | |
| *B32B 37/04* | (2006.01) | |
| *B42D 25/00* | (2014.01) | |
| *B42D 25/45* | (2014.01) | |
| *B32B 7/10* | (2006.01) | |
| *B32B 27/18* | (2006.01) | |
| *B32B 27/28* | (2006.01) | |
| *B29C 47/14* | (2006.01) | |
| *B29K 67/00* | (2006.01) | |
| *B29K 105/00* | (2006.01) | |
| *B29K 105/16* | (2006.01) | |
| *B29L 9/00* | (2006.01) | |
| *B29L 7/00* | (2006.01) | |

(52) U.S. Cl.
CPC .............. *B32B 7/10* (2013.01); *B32B 27/08* (2013.01); *B32B 27/18* (2013.01); *B32B 27/285* (2013.01); *B32B 27/36* (2013.01); *B32B 37/04* (2013.01); *B42D 25/00* (2014.10); *B42D 25/305* (2014.10); *B42D 25/45* (2014.10); *B29C 47/145* (2013.01); *B29K 2067/00* (2013.01); *B29K 2067/003* (2013.01); *B29K 2105/005* (2013.01); *B29K 2105/0026* (2013.01); *B29K 2105/0032* (2013.01); *B29K 2105/0044* (2013.01); *B29K 2105/16* (2013.01); *B29K 2995/0046* (2013.01); *B29L 2007/008* (2013.01); *B29L 2009/00* (2013.01); *B32B 2274/00* (2013.01); *B32B 2307/41* (2013.01); *B32B 2307/412* (2013.01); *B32B 2307/50* (2013.01); *B32B 2307/536* (2013.01); *B32B 2307/54* (2013.01); *B32B 2307/546* (2013.01); *B32B 2307/714* (2013.01); *B32B 2307/732* (2013.01); *B32B 2307/734* (2013.01); *B32B 2307/75* (2013.01); *B32B 2425/00* (2013.01); *B32B 2429/00* (2013.01); *B42D 2033/30* (2013.01); *Y10T 156/10* (2015.01); *Y10T 428/31786* (2015.04)

(56) References Cited

U.S. PATENT DOCUMENTS

| | | |
|---|---|---|
| 5,811,493 A | 9/1998 | Kent |
| 5,914,191 A | 6/1999 | Hanson et al. |
| 5,928,788 A | 7/1999 | Riedl |
| 5,989,723 A | 11/1999 | Tsai et al. |
| 6,433,081 B1 | 8/2002 | Tokunaga et al. |
| 6,673,423 B2 | 1/2004 | Kranenburg-Van Dijk et al. |
| 2002/0119292 A1 | 8/2002 | Venkatasanthanam et al. |
| 2002/0146549 A1 | 10/2002 | Kranenburg-Van Dijk et al. |
| 2003/0091843 A1 | 5/2003 | Murschall et al. |
| 2005/0142371 A1 | 6/2005 | Swain et al. |
| 2006/0228092 A1 | 10/2006 | Hebrink et al. |
| 2006/0272766 A1 | 12/2006 | Hebrink et al. |
| 2007/0119511 A1 | 5/2007 | Donohue et al. |
| 2009/0047450 A1* | 2/2009 | Riedl ................ B32B 27/08 428/32.39 |
| 2009/0202851 A1 | 8/2009 | Maruichi et al. |
| 2010/0021740 A1 | 1/2010 | Tanaka et al. |

FOREIGN PATENT DOCUMENTS

| | | |
|---|---|---|
| DE | 60009728 T2 | 4/2005 |
| EP | 0430282 A2 | 11/1990 |
| EP | 0384252 B1 | 8/1994 |
| JP | 2001080251 A | 3/2001 |
| JP | 2005-054179 A | 3/2005 |
| WO | 97/37849 A1 | 10/1997 |
| WO | 01/85451 A1 | 11/2001 |
| WO | WO2006133953 | * 12/2006 |

OTHER PUBLICATIONS

Database WPI Week 200975, Thomson Scientific, Nov. 5, 2009, London, GB, 2 pages.
International Search Report for PCT/EP2011/000880, dated May 25, 2011.
International Preliminary Report on Patentability for PCT/EP2011/000880, dated Aug. 28, 2012.

* cited by examiner

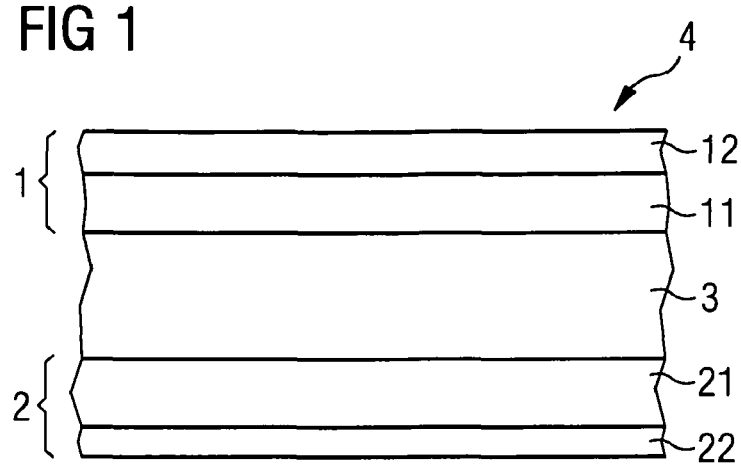
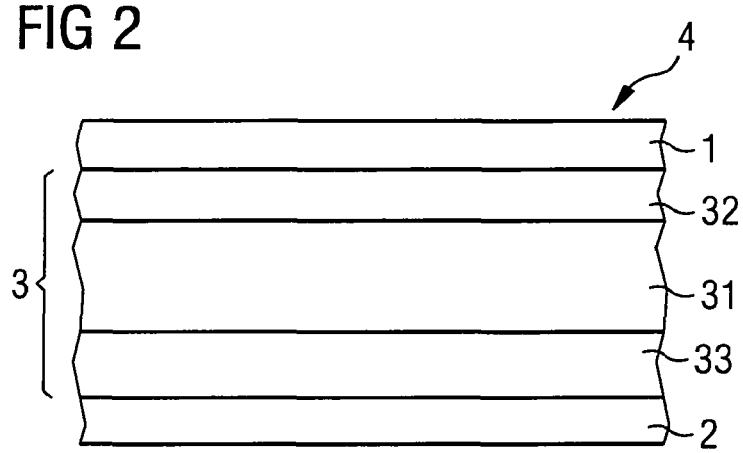
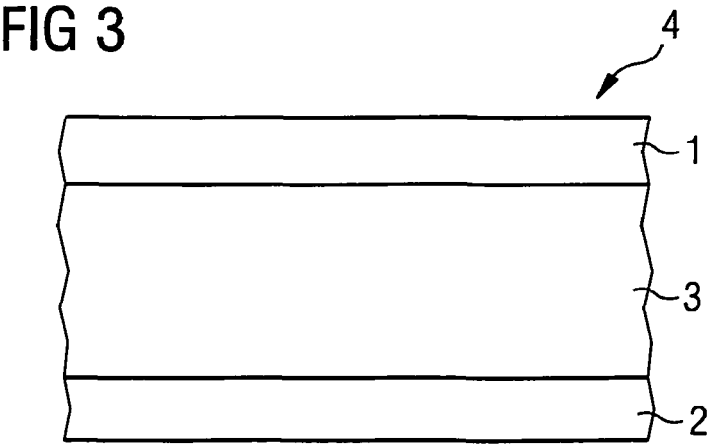

COEXTRUDED FOIL COMPOSITE MATERIAL AND ITS USE IN CARD BODIES

BACKGROUND OF THE INVENTION

A. Field of the Invention

This invention relates to a foil composite material, to a method for manufacturing the foil composite material, as well as to a card body, in particular a card body for a portable data carrier, which contains the foil composite material, and to a method for manufacturing the card body.

B. Related Art

In the production of card bodies, in particular for portable data carriers, such as e.g. chip cards, several plastic foils lying one over the other are laminated to each other. As plastic foils there are usually employed thermoplastic foils because of their good laminatability, e.g. foils made of polyvinyl chloride, polycarbonate, polypropylene, polyethylene terephthalate or thermoplastic polyurethanes. A disadvantage of card bodies made of such thermoplastic foils is their deficient mechanical properties with regard to bending stress and the action of impact force. There result stresses in the card body, and finally cracks. The installation of electronic modules also usually leads to stresses, a weakening of the card body, and ultimately to an elevated susceptibility to cracks and breaks.

To improve the mechanical properties of such card bodies it is advantageous to employ foils made of thermoplastic elastomer, for example based on urethane, within the framework of the laminating process. These foils are exceptionally elastic and can considerably improve the bending strength and breaking strength of the card construction. In the print EP 0 430 282 A2 there is described a card body in the form of a multilayer identification card wherein a layer of thermoplastic elastomer is respectively provided between the card core and corresponding cover foils.

However, it is very difficult to process foils made of thermoplastic elastomer, so-called TPE foils, within the framework of a laminating process upon the manufacture of a card body. On account of their high elasticity the foils are very "limp". The lack of stiffness leads to problems upon processing in the production machines, and the low dimensional stability can also cause register problems upon printing of the foils. In addition, the material tends to flow out upon laminating. Further, such foils possess a low glass transition range, which lies under 0° C., whereby it remains flexible and does not become brittle in this temperature range. Furthermore, the foils tend to block upon stacking, so that the foils in a stack are hard to single and transport. To obtain a sufficient connection stiffness upon lamination of such foils to other materials, it is moreover necessary to reach the glass point of the respective other material. Because this glass point regularly lies far above the glass transition range of thermoplastic elastomers, this frequently leads to the thermoplastic elastomer floating off, in connection with the dependence on the strength of the viscosity drop in the corresponding temperature range. This has the consequence that the employed laminating machines must often be cleaned. In some cases the foils adjacent to the thermoplastic elastomer can even likewise start to flow, and deform a printed image located thereon. Although it is possible to laminate at lower temperatures to thereby prevent the foils from floating off, an insufficiently good laminate bond is normally obtained upon laminating at low temperatures.

Hence, it is desirable to combine the positive properties of thermoplastic foils and of foils made of thermoplastic elastomer in a single foil material. A solution approach in this direction is disclosed in the document EP 0 384 252 B 1. The therein described foil composite material has a multiplicity of layers, whereby a middle layer is made of thermoplastic elastomer. This layer is adjoined by layers made of thermoplastic plastics. Upon the manufacture of the composite material there are applied to a foil forming the middle layer the further layers. One application method is simultaneous extrusion, whereby the layers are merged after leaving the extruder.

SUMMARY OF THE INVENTION

An object of the present invention is to provide a foil material that is suitable for use as a layer in a card body. In particular, the foil material should be readily processable within the framework of producing a card body, and guarantee good mechanical properties of the card body. Desired properties of such a foil material are

- high flexibility in order to guarantee the desired bending strength, in particular dynamic bending strength, of the card;
- the capability to avoid stresses, cracks and breaks in the card, in particular also upon installation of electronic modules into the card;
- good laminatability to common card materials, in particular thermoplastic foils, preferably without auxiliary layers;
- good printability, preferably without pretreatment for printing;
- good dimensional stability upon manufacture and processing;
- simple, and preferably inexpensive, manufacturability;
- good handling upon further processing, in particular avoidance of blocking, as well as
- higher chemical resistance to standard materials.

Another object of the present invention is to provide a card body, in particular a card body for a portable data carrier, that avoids the disadvantages of the prior art. In particular, the card body should readily tolerate the installation of electronic modules and have good resistance to stress cracks and breaks, for example upon bending stress and the action of impact force.

According to the invention there is provided a foil composite material that has at least three layers, whereby an inner layer made of a thermoplastic elastomer is covered on both its surfaces by outer layers made of thermoplastic polymer. Such a foil composite material combines the advantageous elasticity properties of the elastomer with the advantageous properties of the thermoplastic with regard to laminatability and handling. The manufacture of such a composite material raises technical problems, because the employed materials and process parameters must be carefully coordinated with each other to achieve the desired foil properties.

If thermoplastic polymer and elastomer are separately extruded and merged only immediately after leaving the respective extruder nozzle, the mutual adhesive strength of the partial layers may be deficient, so that upon stress in some cases there may occur a partial separation of the foil composite material into its individual layers. According to the invention, hence all employed materials still in a molten state are merged into the foil composite material prior to leaving the extruder nozzle. Only after leaving the extruder nozzle the foil composite material cools down and becomes solid, that is, the foil composite material as a whole cools down and becomes solid and thus forms a so-called coextrusion foil. This procedure requires that the thermoplastic plastic material and the thermoplastic elastomer must be processed at the same temperature or at least within a common temperature range. Thermoplastics typically have a slightly higher melting or processing temperature than thermoplastic elastomers. If thermoplastic elastomers are heated to the typical processing temperatures of thermoplastics, thermoplastic elastomers tend, more than thermoplastics, to thermal degradation, which in turn leads to decreasing viscosity and thus to worse foil bond between thermoplastic plastic and thermoplastic elastomer. Furthermore, thermoplastic plastic and thermoplastic elastomer of course must not repel each other, rather, they must be well compatible with each other and bond to each other, so that they do not delaminate when they are later present in a heavily-used card body. Comparable rheological properties, i.e. comparable melt viscosities, in thermoplastic and thermoplastic elastomer promote a homogeneous melt superimposition and improve the mutual adhesive strength of the layers.

Besides the careful coordination of thermoplastic plastic material and thermoplastic elastomer, one must of course also make sure that extruders are selected whose screw geometries allow the processing of the selected material and make possible the respective necessary throughput for the desired layer thicknesses. In particular, a continuous flow stream of the thermoplastic elastomer must be guaranteed, so as to avoid the danger of thermal degradation and thus the deterioration of the rheological properties of the thermoplastic elastomer.

According to the invention it was found that the requirements for a foil to be used as a layer in a card body are fulfilled in the optimal way when the inner plasticlayer of the foil composite material is manufactured of a thermoplastic copolyester elastomer, and the two outer plastic layers are manufactured of a polyethylene terephthalate glycol copolymer (PETG), the so-called glycol-modified polyethylene terephthalate. One has to bear in mind here that the thermoplastic copolyester elastomer as well as the PETG respectively only represent the plastic materials of the inner layer or of the outer layers. The materials for the inner layer or the outer layers may also contain, besides the plastic material, usual additives, for example color pigments, oxidation stabilizers, flame retardants, optical brighteners, fillers, UV stabilizers, release additives and other auxiliary agents. Color pigments can simultaneously act as fillers. The usual extenders can also be contained, but preferably the layers are free of extenders. In general, the admixture of auxiliary agents is preferably kept low so as to interfere with the coordination of the plastic materials as little as possible.

The two outer plastic layers can be identical or different. Although both outer plastic layers preferably consist of PETG, they can differ with regard to the PETG type used, with regard to their thickness, or with regard to their accessory agents. For example, one of the outer plastic layers could contain an antiblocking agent, while the other one of the outer plastic layers consists of 100% PETG. Preferably, both outer plastic layers are identical.

The foil composite material according to the invention may also consist of more than three layers. According to an embodiment of the foil composite material according to the invention, one or both outer plastic layers respectively consist of two partial layers, an interior outer layer which borders on the inner plastic layer, and an exterior outer layer. Preferably, the layer construction of the foil composite material is symmetrical with regard to the number of outer layers, i.e. either both outer layers respectively consist of only one layer, or both outer layers respectively consist of two partial layers. The two partial layers of an outer layer can also differ with regard to the PETG type used, with regard to their thickness, and with regard to their accessory agents. According to a preferred embodiment, the respectively exterior outer layer contains a small amount of an antiblocking agent, but the interior outer layer not.

According to a different embodiment, the inner plastic layer consists of more than one layer, for example of two or three layers. These layers can in turn be identical or different, i.e. differ with regard to the thermoplastic copolyester elastomer used, with regard to their thickness and/or with regard to their accessory agents. Preferably, however, the layer construction is symmetrical at least with regard to the number of inner layers. A construction with several partial layers can be very advantageous for example when the inner plastic layer is to have a high thickness, but the available extruders do not have the required flow rate. The extrusion process after all must be carried out quickly, so that at the necessary extrusion temperatures no thermal degradation of the thermoplastic copolyester elastomer takes place.

For the inner layer or for the partial layers of the inner layer there can be used a single thermoplastic copolyester elastomer or a mixture of thermoplastic copolyester elastomers. The elastomers must, of course, be readily intermiscible and compatible with each other, i.e. they must have comparable material properties and processing properties.

Thermoplastic copolyester elastomers are available with Shore D hardness from 25 to 70 and with different elongation at break (150 to over 300%). The processing temperatures lie between 200 and 240° C. The melting viscosities (MFI), for example at 2.16 kg and 230° C., can also vary between 3 and 50 $cm^3$/10 min. For the purposes of the present invention, thermoplastic copolyester elastomers (TPC) are preferably used, whose Shore D hardness lies in the range of 33 to 55, whose elongation at break is greater than 300%, and whose melt viscosity lies in the range of 7 to 11 $cm^3$/10 min. This melt viscosity is comparable to that of PETG.

Particularly preferred TPC materials are thermoplastic polyester elastomers of the polyether type. A particularly preferred TPC material is Arnitel VT 3104 (DSM Engineering Plastics).

The thickness of the foil composite material according to the invention varies, depending on the place in the layer sequence of a card body where the foil composite material is to be provided. When the foil material is used as an intermediate layer (inlay), total layer thicknesses in the range of about 50 to 350 µm, for example 240 µm, are preferred. When the foil composite material according to the invention is used as a cover layer (overlay foil), total layer thicknesses in the range of about 80 µm to 130 µm, for example 105 µm, are preferred. Referring to the total layer thickness as 100%, about 10 to 30% respectively falls on the first and the second outer plastic layer here, and accordingly about 80 to 40% on the inner plastic layer. It generally applies that the higher the proportion of the TPC material in the total layer thickness, the better the elasticity properties of the foil composite material. With given TPC content, the advantageous effects of the foil composite material according to the invention in general are the more pronounced, the further outward the foil composite material is located in the card body.

It is further pointed out that each of the above-mentioned layers can consist of a mixture of polymers, for example of a mixture of PETG and TPC, whereby the content of TPC should be the more, the further inward the layer is located, and the content of PETG should be the higher, the further outward the layer is located. The two outermost layers or the two outermost partial layers of the foil composite material should contain exclusively PETG as a plastic material. The particular advantage of the present invention, however, is that no polymer mixtures have to be manufactured for obtaining gradations in the properties of the individual layer materials and thus a good mutual connecting strength of the layers. Rather, upon using PETG and thermoplastic copolyester elastomers without compoundings, i.e. each with only TPC and only PETG, good bond values of the foil composite material (adhesion strength greater than 30 N/cm) can be achieved. Simultaneously, the elastomer proportion is high and the processing uncomplicated.

The manufacture of the foil composite material according to the invention is effected by coextrusion. In so doing, the materials provided for the individual layers of the foil composite material according to the invention are respectively melted in suitable extruders and supplied to a wide slot nozzle or a so-called feedblock. In the nozzle or the feedblock they are merged in the provided layer sequence and jointly extruded through the nozzle. It is of essential significance that the individual plastic melts are merged prior to their discharge from the wide slot nozzle. It is also of significance that the extrusion temperature and the extrusion speed are coordinated with the materials used. The temperatures of the extrusion nozzle can typically lie in the range between 210 and 260° C., whereby it must be taken into account that at higher temperatures the thermoplastic copolyester elastomer material can thermally decompose, so that then a correspondingly high extrusion speed must be ensured. Process data for two exemplary formulations are stated in connection with the FIGS. 1 and 2. Prior to processing all materials must be predried, since they are hygroscopic and through the absorbed moisture in the processing operation they can be degraded through hydrolytic digestion in the extruder. The moisture content should not exceed 0.05%.

The foil composite material according to the invention is in particular suitable for being used as a layer in the layer construction of a card body in order to improve the mechanical properties of the card body.

Card bodies, in particular card bodies for chip cards and other data carriers, typically consist of a multiplicity of layers which are interconnected by laminating. The individual layers usually consist of thermoplastic polymeric materials, such as polyvinyl chloride, polycarbonate or polyethylene terephthalate. Between the layers or in recesses of the layers there can be located electronic components and imprinted antennas. As at least one of the layers of the card body here there is used a foil composite material according to the invention. In particular, the foil composite material according to the invention is used as one or as both cover layers (overlay foil) of the card body. Alternatively or additionally, the foil composite material according to the invention can be provided as an intermediate layer within the card construction (inlay foil).

For manufacturing the card body, the plastic foils that are to form the later card body are laminated to each other. Laminating can be effected in a single operation, i.e. all foil materials that are to form the card body are stacked and laminated in one operation. Alternatively, laminating can be carried out in two or more operations, that is, only a portion of the foils is respectively laminated jointly into a partial stack, and the partial stacks are then stacked and laminated into the card body in a further operation later. A good laminate bond is obtained here by laminating at a suitable pressure and at a temperature between 120° C. and 200° C., in particular between 130° C. and 180° C., preferably between 140° C. and 160° C.

Preferably, laminating is carried out in a heating station and a cooling station. The laminating time preferably lies respectively between 10 minutes and 25 minutes in the heating and/or cooling station.

The card bodies according to the invention typically have total thicknesses in the range of about 0.5 to 1.0 mm The total thickness of the foil composite material according to the invention normally lies between 50 µm and 350 µm, depending on the place in the layered composite of the card body where the foil composite material is to be used. Inlay foils are usually thicker than overlay foils, whereby the total thickness for inlay foils typically lies in the range of 200 µm to 280 µm, and the total thickness for overlay foils typically lies in the range of 80 µm to 130 µm. The foil composite materials according to the invention, due to their outer layers made of PETG, fuse very well with neighboring layers of the card-body layer construction, so that a stable card-body laminate bond is obtained. Laminating adhesives can be used, but they are not necessary. Simultaneously, the PETG outer layers ensure, when the foil composite material according to the invention is used as an overlay foil, that the card bodies can be printed and handled without any problems, and do not tend to block.

BRIEF DESCRIPTION OF THE DRAWINGS

The invention will hereinafter be illustrated further on the basis of Figures. It is pointed out that the figures are not true to proportion and not true to scale. Moreover, it is pointed out that the Figures are only intended to explain the invention more closely and are by no means to be understood as restrictive. The same reference numbers designate the same elements.

There are shown:

FIG. 1 a section through a foil composite material according to the invention having an inner plastic layer, two first outer plastic layers and two second outer plastic layers, FIG. 2 a section through a foil composite material according to the invention having an inner plastic layer which consists of an interior inner layer and two exterior inner layers, and having a first outer plastic layer and a second outer plastic layer, FIG. 3 a section through a foil composite material according to the invention having an inner plastic layer, a first outer plastic layer and a second outer plastic layer, FIG. 4 a section through a card body according to the invention having two foil composite materials according to the invention as cover layers, FIG. 5 a section through a card body according to the invention having two foil composite materials according to the invention as intermediate layers, and FIG. 6 a section through a card body according to the invention having two foil composite materials according to the invention as cover layers.

DETAILED DESCRIPTION OF PREFERRED EMBODIMENTS

Figure 4:
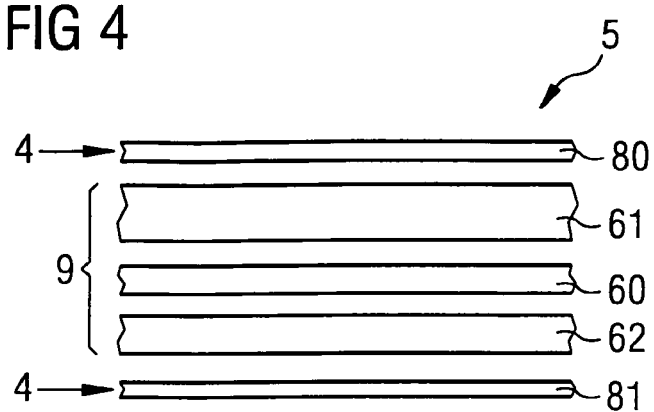

FIG. 1 shows a first embodiment of a foil composite material 4 according to the invention. In the represented embodiment, the foil composite material has five layers, an inner plastic layer 3, a first outer plastic layer 1 and a second outer plastic layer 2, whereby the outer plastic layer 1 consists of an interior partial layer 11 and an exterior partial layer 12, and the outer plastic layer 2 consists of an interior partial layer 21 and an exterior partial layer 22. The inner layer 3 consists of 100% thermoplastic copolyester elastomer or a mixture of thermoplastic copolyester elastomers, and the first outer plastic layer 1 and the second outer plastic layer 2 consist of thermoplastic plastic material, whereby the two interior outer layers 11, 21 consist of 100% PETG, while the two exterior outer layers 12, 22, contain, in addition to PETG, an antiblocking agent, for example about 4 wt. % antiblocking agent, with the balance being PETG. The contents are always stated in wt. %.

The manufacture of the foil composite material 4 can be effected for example by melting granules with three different compositions (granules A: 96% PETG+4% antiblocking agent; granules B: 100% PETG; granules C: 100% TPC) in three extruders A, B, C, and merging the corresponding molten streams (material A from extruder A, material B from extruder B, material C from extruder C) in a feedblock and jointly extruding them through a wide slot nozzle. In the represented embodiment, the foil composite material is symmetrical in construction, i.e. the interior outer layers 11, 21 and the exterior outer layers 12, 22 respectively have the same composition and the same thickness. This is not compulsory. Rather, the interior outer layers 11, 21 or the exterior outer layers 12, 22 can respectively differ from each other, for example contain different PETG, have a different thickness or have a different content of antiblocking agent. In such a case, correspondingly more extruders are necessary in a modified feedblock or wide slot nozzle arrangement. Preferably, however, the foil composite materials are symmetrically constructed, for reasons of an easier manufacturability, on the one hand, and since an unsymmetrical construction usually provides no advantages, on the other hand.

In the represented embodiment, the inner plastic layer 3 is the thickest layer. This usually will actually be so in practice, since a proportion of TPC material as high as possible is desired, in order to achieve a high elasticity of the foil composite material 4. Exemplary layer thicknesses are respectively about 10% of the total thickness for the layers 12, 22, respectively 20% of the total layer thickness for the layers 11, 21, and about 40% of the total layer thickness for the layer 3.

The following extruder settings achieved good results:

|  | Temperature [° C.] | Feed zone [° C.] |
| --- | --- | --- |
| Extruder A | 220-260 | 40-60 |
| Extruder B | 225-250 | 40-60 |
| Extruder C | 215-245 | 40-70 |
| Nozzle | 210-260 |  |

The respective most favorable extruder settings can vary in dependence on the extruders employed (throughput, screw geometries or the employed materials and their residual moisture content). They provide information for orientation, which a person skilled in the art can optionally adapt to the given extruder configurations and given material facts by a few routine tests.

FIG. 2 shows a different embodiment of a foil composite material 4 according to the invention in cross section. In this embodiment, the inner plastic layer consists of an interior partial layer 31 and two exterior partial layers 32, 33. Located thereon are a first outer plastic layer 1 and a second outer plastic layer 2. The inner layers 31, 32, 33 in turn consist of thermoplastic copolyester elastomer (TPC), whereby all inner layers can consist of the same TPC material or of different TPC materials. If desired, for one or several of the inner layers 31, 32, 33 there can also be employed a mixture of TPC materials, or a mixture of one or several TPC materials with a thermoplastic, for example PETG. In this way gradations can be produced, i.e. a gradual transition from, for example, a layer 31 made of 100% TPC material over a layer 32 or 33 made of TPC material with PETG admixture to a layer 1 or 2 made of 100% PETG. It is preferred, however, to use pure TPC material, in particular the same TPC material, for all inner layers 31, 32, 33. The special advantage of the present invention lies in the fact that upon using thermoplastic copolyester elastomers for the inner layers in combination with PETG for the outer layers, no compoundings are necessary for producing compatible transitions between the layers.

The manufacture of the foil composite material 4 represented in FIG. 2 can be effected analogously to the foil composite material represented in FIG. 1. That is, in an extruder A for example a plastic material made of 96% PETG with 4% antiblocking agent is melted for the outer layers 1 and 2 and fed to a wide slot nozzle, and in two extruders B and C a plastic material made of 100% TPC is respectively melted and fed to the wide slot nozzle, whereby the feeding is effected such that the layer construction represented in FIG. 2 is produced. Extruder C, which extrudes the material for the thickest inner layer 31, must have the greatest flow rate. However, it is also possible that the extruder C does not have the greatest flow rate. The flow rate of the individual extruders can be generally adapted to the production conditions and to the specific requirements of the plastic material respectively used and the layer to be manufactured therewith.

In the following there are stated exemplary extruder settings for manufacturing the foil composite material 4, which optionally are to be adapted to the extruder configurations and material moistures present in the respective individual case.

|  | Temperature [° C.] | Feed zone [° C.] |
| --- | --- | --- |
| Extruder A | 220-250 | 40-60 |
| Extruder B | 215-240 | 40-60 |
| Extruder C | 215-240 | 40-60 |
| Nozzle | 210-250 |  |

For all embodiments and layer sequences of the foil composite material according to the invention it has proven to be particularly useful to use the following materials:
Arnitel VT 3104 as a thermoplastic copolyester elastomer,
Eastman PETG 6763 as a thermoplastic polymer,
Release Sukano S 462 as an antiblocking agent.

FIG. 3 shows a further embodiment of the foil composite material 4 according to the invention. This embodiment has the simplest layer construction with a single inner layer 3 made of TPC material and two outer layers 1, 2 made of PETG. One or several of the layers can contain, as in all other embodiments, usual accessory agents, for example dyes, UV protection agents or (in the outer layers) antiblocking agents. Antiblocking agents, however, are not absolutely necessary.

Usually it is desired that the inner layer made of TPC material has an as great a proportion as possible in the total thickness of the foil composite material, so that the advantageous elasticity properties of the TPC material have a good effect. The outer layers 1, 2 made of PETG are usually kept thin because they are to serve for equipping the inner TPC layer(s) with the surface properties of the thermoplastic polymer PETG. Further, the outer layers 1, 2 are to provide the needed stiffness to the foil, so that this can be further processed in the common methods, such as e.g. for printing, handling etc. These properties are for example the good laminatability, handling without massive danger of blocking, good printability, etc. From this point of view, the layer thickness of the inner TPC layer should have a proportion of at least 40% in the total thickness of the foil composite material. Preferred are proportions of 60 to 80% TPC layer thickness in the foil material layer thickness. In order to be able to achieve these high layer thicknesses, the inner TPC layer is composed of several partial layers usually with the help of several extruders.

It is in principle possible that both the outer plastic layers 1, 2 and the inner plastic layer 3 are respectively composed of several partial layers. Simultaneously, however, it is preferred that the foil composite material 4 produced has no more than seven partial layers, since the coextrusion is more difficult in terms of process engineering, the more partial layers have to be coextruded with each other. Therefore, preferably either the inner layer 3 or the outer layers 1, 2 consist of partial layers, whereby the outer layers respectively should be constructed from no more than two partial layers, and the inner layer should be constructed from no more than five, preferably no more than three, partial layers.

Figure 5:
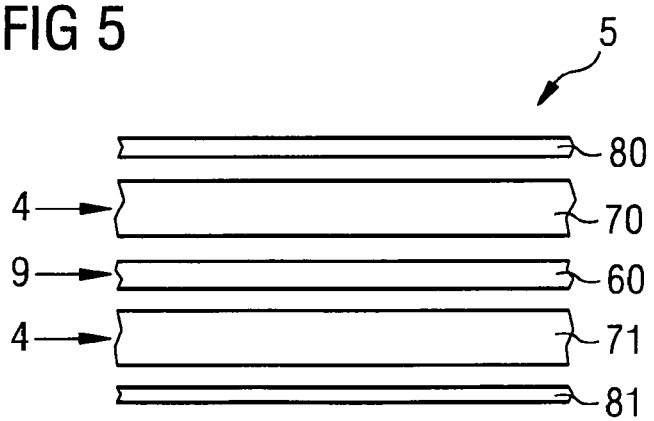
Figure 6:
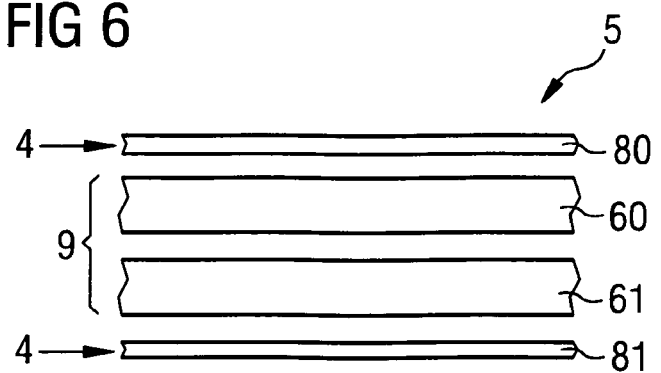

FIGS. 4, 5 and 6 respectively show exemplary layer constructions for card bodies 5 according to the invention (exploded views). In general, card bodies according to the invention consist of a card core 9 which is typically constructed from one to seven layers. The layers consist of thermoplastic foils, typically made of PVC, ABS, polyester, polycarbonate, PEC (blend of PC and one or several other polyesters) and the like. Between the layers and/or in recesses of the layers there can be located electronic components such as electronic modules and antennas. Other features, such as for example security elements or imprints, can also be provided. The layer construction is respectively completed on the outer side by a cover layer. The foils forming the layer construction are preferably interconnected by laminating, which is why all materials used should be readily laminatable to each other.

FIG. 4 shows an embodiment of a card body 5 according to the invention having a card core 9, consisting of a PET foil 60 (152 μm), onto which, optionally, a coil (not shown) can be imprinted, and two PVC foils 61, 62 (240 μm each). The layer construction is completed by the two cover foils 80, 81 (105 μm each), which consist of the foil composite material 4 according to the invention, as was described hereinabove.

FIG. 5 shows another embodiment of a card body 5 according to the invention. Here, the card core 9 consists of a single PET foil 60 (152 μm) having an imprinted antenna (not shown). The PET foil 60 is adjoined on both sides by the layers 70, 71 (240 μm each). The layers 70, 71 in this embodiment consist of the foil composite material 4 according to the invention. The layer construction is completed by the two cover layers 80, 81 made of a PETG overlay foil (105 μm each).

A further alternative embodiment for a card body 5 according to the invention is represented in FIG. 6. Here, the card core 9 consists of the PETG foils 60, 61 (310 μm each), onto which the cover layers 80, 81 (105 μm each) are laminated. The cover layers 80, 81 consist of the foil composite material 4 according to the invention.

In FIGS. 4, 5 and 6, the μm-values in brackets respectively denote the thicknesses. It goes without saying that the specified layer thicknesses as well as the specified materials are to be understood only by way of example, and that other materials which are laminatable to each other as well as deviating layer thicknesses and deviating numbers of layers can also be used. Further, the card constructions are represented symmetrically in the Figures, which, however, is by no means compulsory. Essential is, that the foil composite material 4 according to the invention can be both used as a cover layer, as shown in FIG. 4 and FIG. 6, and as an intermediate layer, as shown in FIG. 5. Embodiments are also possible wherein the foil composite material 4 according to the invention is used only as one of the cover layers and/or as an intermediate layer, and embodiments which have cover layers and intermediate layers which are both made of the foil composite material 4 according to the invention. Upon use as a cover layer (overlay foil), the layer thickness of the foil composite material 4 is typically no more than half as thick as upon a use as an intermediate layer (inlay foil). As a cover layer the foil composite material according to the invention is preferably transparent, while as an intermediate layer it is preferably opaque.

Through the employment of the foil composite material according to the invention as cover layer(s) and/or as intermediate layer(s) in a card body, the mechanical properties of card bodies can be decisively improved over card bodies of the prior art. The card bodies can be subjected to stronger and more frequent bending loads without there occurring stresses, cracks or breaks of the card body. Stresses arising from the installation of electronic modules, which always cause a weakening of the card body, can also be compensated and thus the mechanical properties of the card body improved. The foil composite material according to the invention can be employed in the card bodies instead of any standard foil. It is itself highly flexible and gives the card bodies flexibility.

In particular card constructions wherein the foil composite material according to the invention is employed as an intermediate layer, as represented by way of example in FIG. 5, have excellent mechanical properties, such as excellent strength and stiffness. This becomes evident particularly in the case of actions of impact force, which otherwise as a rule lead to card breakage. This is presumably caused by the greater thickness of the foil composite material intermediate layers, and thus the higher proportion of the foil composite material according to the invention in the card body altogether.

The foil composite material according to the invention is also very stable in itself, i.e. there is a firm bond between the partial layers made of PETG and thermoplastic copolyester elastomer without any danger of the partial layers separating from each other upon load. This stability can be achieved without producing gradations between the partial layers by the use of material mixtures. Therefore there is no need for producing compoundings of granules upon the coextrusion.

The foil composite material according to the invention can be manufactured inexpensively, and there is a wide spectrum of thermoplastic copolyester elastomers with different properties available on the market. The foil composite material made of PETG and thermoplastic copolyester elastomers is easier to process by the coextrusion method than foils with other thermoplastic elastomers. It is also characterized by especially simple handling in further processing, i.e. it can for example be printed without any problems and laminated to all common card materials. It also does not tend to block. A special advantage that makes the foil composite material according to the invention excellently suitable in particular for use as a layer in a card body, is the act that the foil composite material can be manufactured with a very high proportion of thermoplastic elastomer, thereby improving the mechanical properties of the card body in an excellent manner.

The invention claimed is:

1. A method for manufacturing a card body having a plurality of foil composite layers, comprising:
   a card core made of at least one inlay foil layer,
   at least two cover foil layers for covering both surfaces of the card core, and
   wherein the foil composite layers are laminated to each other in one work operation or in several work operations, wherein there is used as at least one of the cover foil layers and/or as the at least one inlay foil layer a foil composite material,
   wherein the foil composite material comprises:
   an inner layer formed between a first outer layer and a second outer layer,
   the first outer layer comprising terephthalate glycol copolymer (PETG),
   the second outer layer comprising PETG,
   the inner layer comprising a single thermoplastic copolyester elastomer (TPC) and being the thickest layer of the foil composite material.

2. The method according to claim 1, wherein laminating is effected at a temperature of between 120° C. and 200° C.

3. The method of claim 1, wherein the first outer layer, the second outer layer and the inner layer of the foil composite material being in the form of a coextrusion comprising:
   merging all the materials of the first outer layer, the second outer layer and the inner layer in a molten state, and extruding them through an extruder nozzle that extrudes a foil, to thereby obtain an extruded foil composite material.

4. The method according to claim 1, wherein the inlay foil layer has a thickness in the range of about 50 to 350 μm.

5. The method according to claim 1, wherein the cover foil layers have a thickness in the range of about 80 to 130 μm.

6. The method according to claim 1, wherein the foil composite material has a total layer thickness made up of 80 to 40% the inner layer and 10 to 30% the first and second outer layers.

7. The method according to claim 1, wherein between the at least one inlay foil layer and the cover foil layers there is located electronic components and imprinted antennas.

8. The method according to claim 1, wherein the card body has a total thickness of 0.5 to 1.0 mm.

* * * * *